United States Patent [19]

Barry et al.

[11] Patent Number: 4,866,477

[45] Date of Patent: Sep. 12, 1989

[54] AUTOMATIC LENS SELECTION FOR DESIRED OPTICAL REDUCTION RATIO IN A MICROFILM CAMERA

[75] Inventors: Robert V. Barry, Waterport; Ensley E. Townsend, Rochester, both of N.Y.

[73] Assignee: Eastman Kodak Company, Rochester, N.Y.

[21] Appl. No.: 204,794

[22] Filed: Jun. 10, 1988

[51] Int. Cl.$^4$ ............................................. G03B 27/52
[52] U.S. Cl. ..................................... 355/55; 350/254; 354/286
[58] Field of Search ........................ 355/46, 55, 56, 77, 355/14 R, 3 R; 354/286; 350/254

[56] References Cited

U.S. PATENT DOCUMENTS

| | | | |
|---|---|---|---|
| 3,283,648 | 11/1966 | Froese | 355/55 X |
| 3,779,642 | 12/1973 | Ogawa et al. | 355/55 |
| 3,832,058 | 8/1974 | Gusovius | 355/56 |
| 3,946,222 | 3/1976 | Swanberg | 250/201 |
| 3,996,596 | 12/1976 | Kurtik | 355/55 X |
| 4,011,012 | 3/1977 | Kawai | 355/55 |
| 4,027,968 | 6/1977 | Spence-Bate | 355/46 |
| 4,172,657 | 10/1979 | Watanabe et al. | 355/55 |
| 4,266,855 | 5/1981 | Mohr | 355/55 X |
| 4,268,165 | 5/1981 | Bradmon | 355/55 |
| 4,307,940 | 12/1981 | Hagedorn-Olsen | 355/55 X |
| 4,316,668 | 2/1982 | Miller | 355/55 |
| 4,412,737 | 11/1983 | Iwanade et al. | 355/55 |
| 4,441,805 | 4/1984 | Smith | 355/14 R |
| 4,552,450 | 11/1985 | Tomosada et al. | 355/14 |
| 4,610,539 | 9/1986 | Kaneko et al. | 355/77 |
| 4,629,308 | 12/1986 | Landh et al. | 355/3 R |
| 4,636,061 | 1/1987 | Staude et al. | 355/24 |
| 4,643,562 | 2/1987 | Kaneko et al. | 355/56 |
| 4,647,190 | 3/1987 | Nitsch et al. | 355/55 |

Primary Examiner—Richard A. Wintercorn
Attorney, Agent, or Firm—Dennis R. Arndt

[57] ABSTRACT

A microfilm camera of the continuous type in which both the document and the film move continuously during filming, includes means whereby a user operator enters a desired optical reduction ratio into the keyboard of a main or host computer associated with the microfilm camera. The main computer, through appropriate communication with a microcomputer, automatically selects a lens of the appropriate focal length corresponding to the optical reduction ratio selected, and automatically establishes the correct film transport speed in accordance with the requested reduction ratio so that the relationship between the fixed transport speed of the document and the adjusted transport speed of the film causes the film image to have the same magnification ratio in the direction of movement as it has in the transverse direction. The provision of the appropriate lens and the adjustment of the film speed are accomplished by respective motors controlled by the mcicroprocessor. Accordingly, time-consuming manual selection of the appropriate lens and the corresponding manual adjustment of the film transport speed are eliminated.

5 Claims, 6 Drawing Sheets

AUTOMATIC LENS SELECTION FOR DESIRED OPTICAL REDUCTION RATIO IN A MICROFILM CAMERA

Technical Field

The present invention relates to an automatic microfilm camera in which the optical reduction ratio is automatically selected by the operator through a keyboard by the operator which communicates with a microcomputer to automatically select the proper focal length lens corresponding to the desired reduction ratio.

CROSS-REFERENCE TO RELATED APPLICATIONS

Reference is made to commonly-assigned, copending U.S. patent applications Ser. No. 204,836, entitled "SPEED CONTROL FOR FILM AND DOCUMENT TRANSPORT DRIVE IN A MICROFILM CAMERA, in the name of E. E. Townsend, and to U.S. Ser. No. 204,795, entitled "AUTOMATIC ADJUSTMENT OF FOCAL LENGTH TO OBTAIN DESIRED OPTICAL REDUCTION RATIO IN A MICROFILM CAMERA, in the name of E. E. Townsend, both filed concurrently herewith.

BACKGROUND ART

Microfilm copying is a process wherein photographically reduced images of documents are sequentially formed, usually in successive frames on a reel of film, which is thereafter removed from the copy area. During this process, the film transport speed required for normal microfilming is directly proportional to the optical reduction ratio. In a rotary microfilmer, the document and film are in continuous motion during the microphotographing process.

Depending on the type of material being copied, different magnifications are desired, which is typically accomplished by manually replacing lenses of different focal lengths. There are a number of what can be considered standard reduction ratios in the industry, namely 24X, 40X and 50X; with some reduction ratios going as high as 150X. The selection of a particular ratio is based on a trade-off between clarity and ease of viewing the magnified image for the lower ratios; while the higher packing density of images on the film favors the higher reduction ratios.

In a so-called rotary microfilmer machine, the document and film are in continuous motion during the microphotographing process and the exposure is made through a narrow slit in a plate located in the optical path between the document and the film. Consequently, the size of the image in the direction of relative movement between the document and the paper is dependent on the relative speed of movement between those elements, which must be adjusted to maintain the proper aspect ratio of the copy when the magnification is changed.

The micrographics industry has relied on two techniques in the past to change from one optical reduction ratio to another. One technique involves replacing the entire camera subassembly comprising the lens and mechanical drive components. Thus, each camera subassembly is dedicated to one and only one reduction ratio. Such an arrangement is bulky, requiring additional storage space as well as being costly, requiring the duplication of a number of parts in each camera subassembly. The second technique uses two or three lenses adjacently mounted on a carriage controlled by a lever that will move the appropriate lens on the carriage into position. It is also common that the same lever is used to select the film transport speed ratio by shifting gears or changing pulleys to adjust the transport and film speeds so that they correspond to the reduction ratio selected.

Disclosure of the Invention

An object of the present invention to provide an automatic microfilm camera having a plurality of lenses of different focal lengths that correspond with designated image reduction ratios with means for automatically changing lenses and for effecting corresponding adjustment of the film transport speed. The camera comprises a means for positioning any one of the plurality of lenses into an operative position using a carriage or a turret. Electronic means in the form of a microprocessor are provided for controlling the positioning means. Information is supplied by input means, such as a keyboard, to the electronic means concerning the selection of a desired one of the plurality of lenses which correspond to the required image reduction ratio.

Another object of the present invention is to eliminate the above disadvantages associated with the changing of lenses whenever a different optical reduction ratio is required.

Another object of the computer programmable selection of the optical reduction ratio is that it does not require additional hardware components to accommodate changes in the optical reduction ratios but merely requires the entry into a keyboard of a number which corresponds to the desired ratio.

BRIEF DESCRIPTION OF THE DRAWINGS

Modes of carrying out the invention will be described with reference to the drawings, wherein.

MODES OF CARRYING OUT THE INVENTION

Because automatic microfilm cameras are well known, the present description will be directed in particular to the elements forming part of the present invention and its use in such photographic cameras. It will be understood that camera elements not specifically shown or described may take various forms well known to those having ordinary skill in the art.

Figure 1:
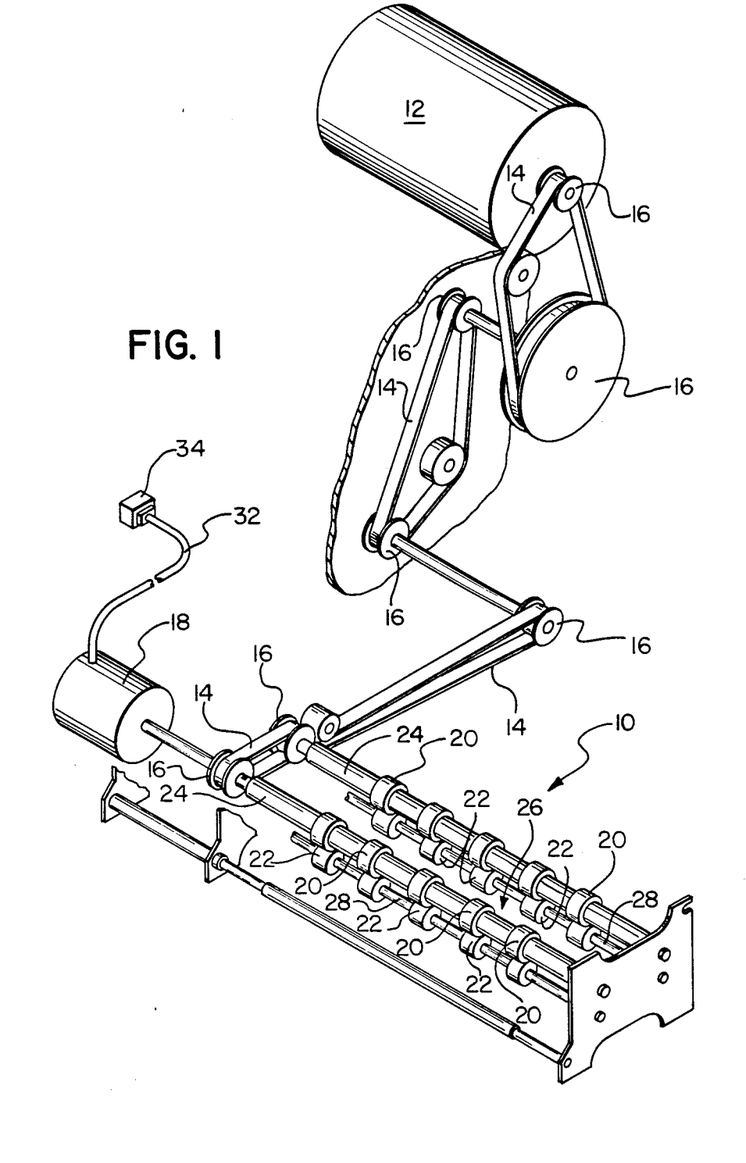
FIG. 1 is a schematic perspective diagram illustrating the basic components of the document drive system according to the present invention.

The drive mechanism for the document transport system 10 shown in FIG. 1 comprises a main drive AC motor 12, drive belts 14, drive pulleys 16, optical incremental encoder 18, drive rollers 20, normal force rollers 22 and drive roller shafts 24. The main drive AC motor 12 is powered from the AC electric main supply (not shown) and the motor 12 supplies mechanical power to the document transport system 10, including all the drive rollers 20. Mounted on the shaft of the main drive motor 12 is a pulley 16, which directs the mechanical power of the motor 12 through a series of belts 14 and pulleys 16 to the drive rollers 20 mounted on shaft 24. What is commonly known as the photographic aperture or exposure station is generally shown at 26. It is located in the space between the drive roller shafts 24 and the two sets for normal force rollers 22 mounted on shafts 28. Normal force or pressure rollers 22 urge the document against the drive rollers 20, so that the document is moved through the photographic aperture or exposure station 26, where the document is illuminated and photographed by means not shown.

The optical incremental encoder 18, sometimes referred to as an aperture encoder or shaft encoder, is mounted directly to the first drive roller shaft 24. The frequency of the aperture encoder's output signal is the product of the drive roller shaft's angular velocity in revolutions per second, and the encoder's resolution in line pairs per revolution. A line pair of the encoder's disk results in one cycle, consisting of a rising and a falling edge of the square wave output. The greater the number of line pairs, the finer each revolution may be divided so that the accuracy and speed control are increased accordingly. The encoder signal is fed to a servo control electronics board 30 illustrated in FIG. 2, via cable 32 attached by connector 34 (FIG. 1). DC power is also delivered from the servo electronics board 30 by the cable 32 to the optical encoder 18.

Film Drive

Figure 2:
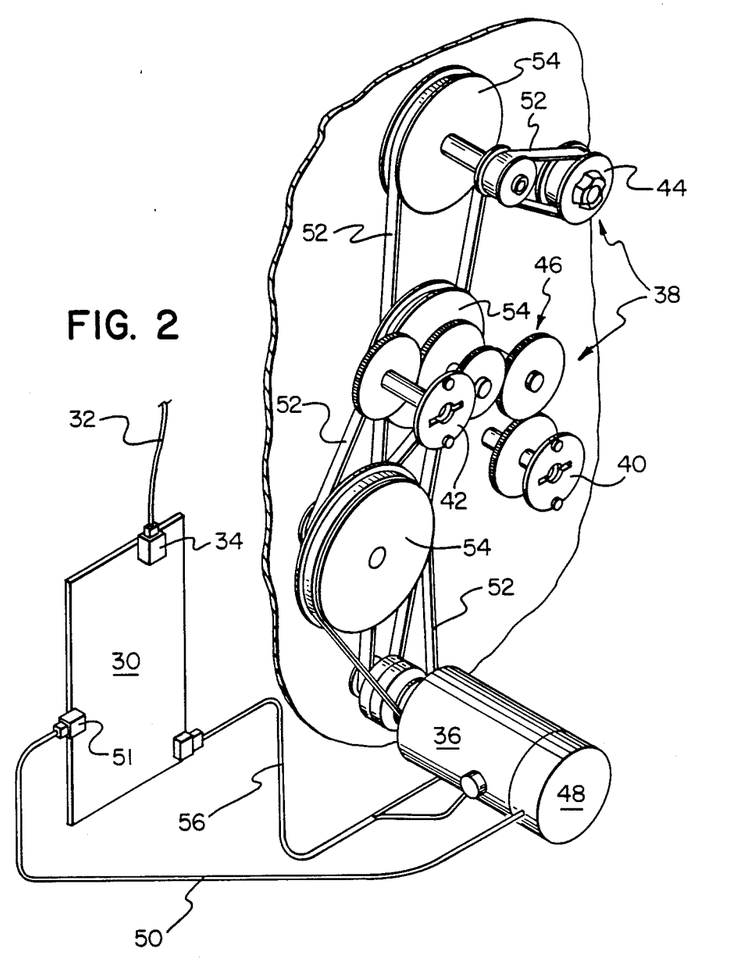
FIG. 2 is a schematic perspective diagram of the film drive's major control and drive components according to the present invention.

DC motor 36, illustrated in FIG. 2, supplies power to the film drive shown generally at 38 and is comprised of film supply drive 40, film take-up drive 42 and film metering roller drive 44. Power from the DC motor 36 is transferred by a series of drive belts 52 and drive pulleys 54 to the film drive components 40, 42, and 44. An appropriate gear drive 46 is provided to maintain the required tension and film speed between the film take-up 42 and the film supply 40 during film transport. The film is exposed at the film metering roller drive 44 (by means not shown). Accordingly, it is necessary that the angular rotation of the metering roller drive 44 is controlled in such a way that the motion of the film is correlated accurately with the linear velocity of the document. The servo control electronics board 30, also referred to as servo board, controls the angular rotation of the DC motor 36 and hence the angular rotation of the metering roller drive 44 to ensure proper coordination of the film motion to the document motion for a given reduction ratio. The optical incremental encoder 48 is mounted directly to the shaft of the DC motor 36 for the most accurate control of the motor speed. The feedback encoder 48 provides a TTL output waveform indicative of the angular velocity of the shaft (not shown) of DC motor 36. The frequency of the output waveform of the feedback encoder is the product of the angular velocity of the DC motor 36 in revolutions per second, and the resolution in line pairs per revolution of the encoder 48. The signal from the encoder 48 is fed into the servo board 30 via cable 50 connected to the board by plug 51 as shown in FIG. 2. The cable 50 is also used to transport DC power from the servo board 30 to the encoder 48. Another cable 56 is connected between the servo board 30 and the DC motor 36 and provides the requisite power to the DC motor 36 to maintain the correct controlled speed for the film drive 38.

Figure 3:
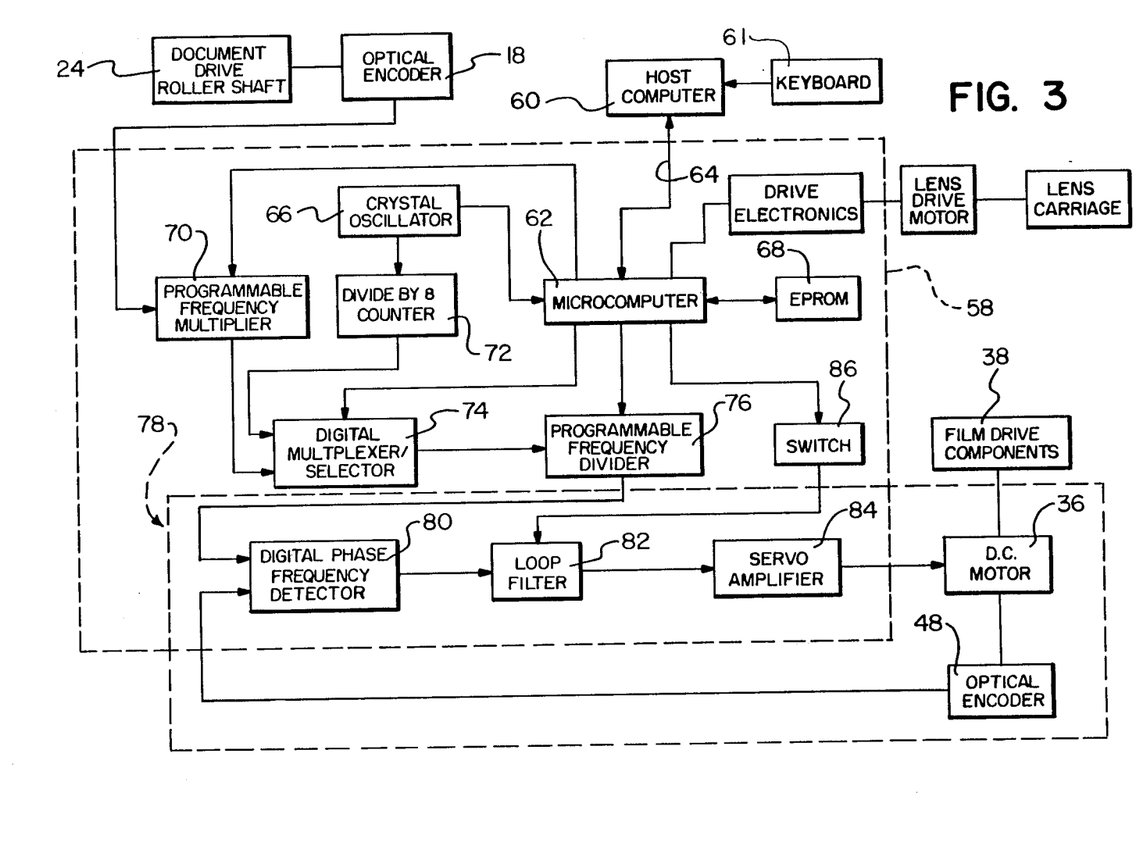
FIG. 3 is a schematic block diagram illustrating the electronics forming a part of the present invention.

FIG. 3 illustrates the major functional elements contained on the servo electronics board 30 and some of the external elements that are connected to the board 30. The broken line 58 indicates the electronic board 30 and all elements within its boundary reside on the electronics board 30.

The host computer 60 is the main control processor (MCP) for the microfilmer; it is this computer that sends commands such as film drive "start" and "stop" and film speed "select" to the electronic board 30 where microcomputer 62 is located. The microcomputer 62 transmits status information related to the operation of the film drive 38 to the host computer 60. The microcomputer 62 is a single-chip, 8-bit microcomputer such as the Intel 8032, which contains, among other functions, 256 bytes of RAM memory, three 16-bit timer/counters, six interrupt sources and a programmable full duplex serial communication channel 64. It is used for communication between microcomputer 62 and the host computer 60. A crystal oscillator 66 is a typical quartz crystal oscillator with a TTL output at 11.05920 MHz and is used to provide the internal clocking and timing signals of the microcomputer 62. In addition, crystal oscillator 66 provides a clock signal, as will be described later, which can be selected as the reference signal input for the servo system controlling the DC motor 36 and film drive 38 instead of the signal derived from aperture encoder 18. EPROM 68 is an erasable programmable read-only memory such as a Hitachi Part No. HN27512G-25. EPROM 68 contains the program memory for microcomputer 62 in the form of firmware, which is to be executed by microcomputer 62. The output frequency of aperture encoder 18 is directed to programmable frequency multiplier 70, which multiplies the frequency by a programmable multiplier, so that the resulting frequency at the output is on the order of 1 MHz, with a fixed phase relationship to the output frequency of the aperture encoder 18. The frequency multiplier 70 will be discussed in greater detail below.

A divide by 8 counter 72, that receives the output from crystal oscillator 66, may be any synchronous 4-bit binary counter such as a Texas Instruments SN74ALS161A. The output of counter 72 is one eighth the frequency of crystal oscillator 66. A digital multiplexer/selector 74, such as a Texas Instruments SN74ALS153, can select as its output either the output from programmable frequency multiplier 70 or the output from divide by 8 counter 72. Microcomputer 62 determines which of the inputs is to be selected by the digital multiplexer 74 and sent to a progammable frequency divider 76. The programmable frequency divider 76 may take the form of an Intel 8254. The divider 76 functions such that its TTL output is equal to the frequency of the input wave form (i.e., from the digital multiplex/selector 74) divided by a count modulus n (counter divide ratio), which is computer programmable via microcomputer 62.

As mentioned earlier, the source of the output waveform from the programmable frequency divider 76 may be either the aperture encoder waveform 18 (after passing through programmable frequency multiplier) or the crystal oscillator waveform 66 (after passing through divide by eight counter 72), depending on which is selected by microcomputer 62. The waveform from aperture encoder 18 is selected as the reference frequency input signal for document filming operations and, in these instances, the angular velocity of the DC motor 36 is controlled so that it is synchronized to the angular velocity of the drive roller shaft 24. Accordingly, the film's velocity is then synchronized, by some predetermined ratio, to the document's velocity. The waveform from crystal oscillator 66 is selected as the input to the programmable frequency divider 76 if it is desired to operate the film drive 38 independently of the motion of the document transport 10. Such independent operation might be used, for example in conjunction with high speed film advance, where the film drive is activated irrespective of whether or not the document drive is operational. It is possible, but not usually advantageous, for the crystal oscillator 66 to be selected as the reference input signal for normal microfilming operations. In this situation, the film drive 38 is operated asynchronously with respect to the document transport 10. The disadvantage of this type of operation is that the film image is now more sensitive to disturbances that occur in the document transport with no means being provided for automatically adjusting the film speed in response to those disturbances.

The output of the programmable frequency divider 76 acts as an input to phase-locked loop system 78, which comprises the following: digital phase frequency detector 80, loop filter 82, servo amplifier 84, DC motor 36 and optical encoder 48. Digital phase frequency detector 80 generates an error voltage at its output that is porportional to the frequency and/or phase difference between the TTL input waveforms from the programmable frequency divider 76 and the signal generated by the feedback encoder 48. The digital phase frequency detector 80 may be a Motorola MC4044. The loop filter 82 is an active filter consisting of resistors, capacitors, and operational amplifiers such as the Texas Instruments µA 741, and is used to stabilize the phase-locked loop system 78 and to generate a DC output signal, which is directly proportional to the error voltage placed on its input. The servo amplifier 84 is a DC amplifier which amplifies the output signal from the loop filter 82 so that it can be used to drive DC motor 36. The optical encoder 48 is connected to the shaft of the DC motor 36 and generates a signal proportional to the speed of the DC motor 36. This signal is compared by the digital phase frequency detector 80 to the output of the programmable frequency divider 76. Thus, the phase-locked loop 78 tracks the frequency of the reference waveform derived from the output of the programmable frequency divider 76 and maintains a fixed phase relationship between the feedback waveform from the optical encoder 48 and the output from the programmable frequency divider 76. Consequently, the angular velocity of the DC motor 36 tracks the angular velocity of the document drive roller shaft 24, which results in the motion of the film being synchronized by some given ratio to the motion of the document. A dual single-pole-single-throw analog switch 86, such as that manufactured by Precision Monolithics Incorporated, Part No. SW-05 is used by the microcomputer to turn the DC motor 36 on and off, which in turn starts or stops the film drive 38.

Figure 4:
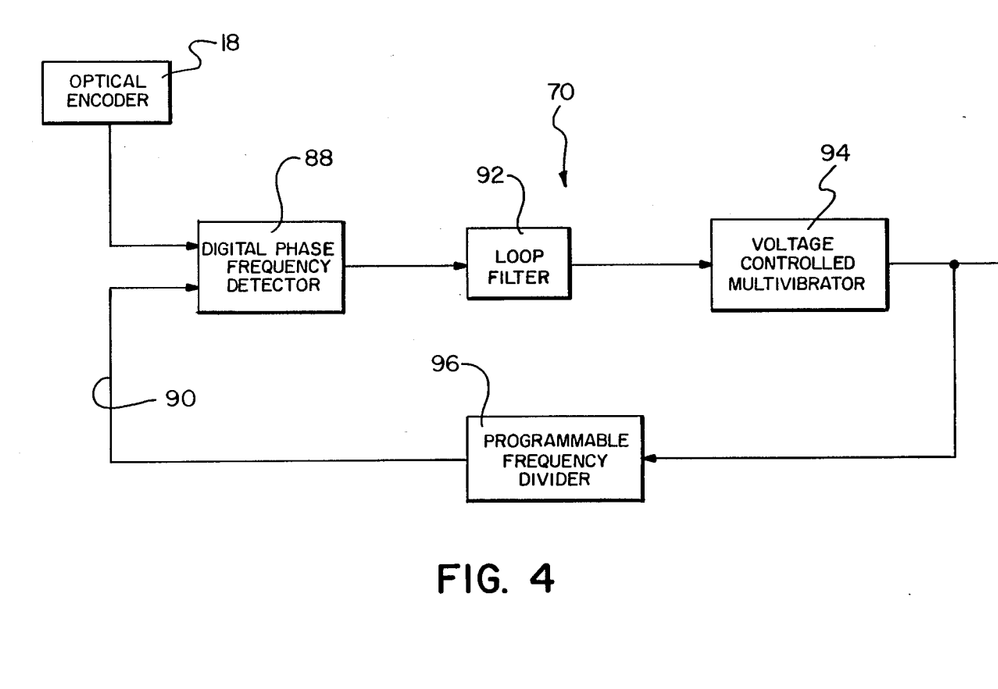
FIG. 4 is a schematic block diagram illustrating in more detail the contents of the programmable frequency multiplier illustrated in FIG. 3.

The programmable frequency multiplier 70 also uses phase-locked loop techniques internally and is actually a frequency synthesizer with a variable frequency input and a variable frequency output. FIG. 4 illustrates the functional elements of programmable frequency multiplier 70. A phase frequency detector 88 generates an error voltage that is proportional to the frequency and/or phase difference of the TTL signals occurring at its input, which are the output signal from the optical encoder 18 and the feedback signal on line 90. A loop filter 92 consisting of resistors, capacitors, and an operational amplifier such as a Texas Instrument µA 741 is used to stabilize the loop and generates at its output a DC voltage which is directly proportional to the error voltage signal appearing on the output of phase frequency detector 88. A voltage controlled multivibrator 94, such as the Motorola MC4024, accepts as its input the DC control voltage (in the range of 2.5 V to 5.5 V) from the output of the loop filter 92 and generates an output TTL signal, the frequency of which is in the range of 1.0 MHz to 5.0 MHz. A portion of this output signal is fed back through a programmable frequency divider 96 such as an Intel 8254, which is a 16-bit programmable counter. The output of the programmable frequency divider 96 follows the waveform of the optical encoder 18 in frequency, but exhibits a small but fixed phase relationship relative thereto. The TTL output waveform found on the output of the voltage controlled multivibrator 94 is phase-locked to the output signal of the optical encoder 18. The frequency of the output is directly proportional to the frequency of the output signal from the optical encoder 18. The constant of proportionality between the two signals is the count modulus (counter divide ratio) of the programmable frequency divider 96. The count modulus is computer programmable by the microcomputer 62.

The frequency of the output waveform from the programmable frequency multiplier 70 can be controlled within the limits of the voltage controlled multivibrator 94 (1.0 MHz to 5.0 MHz), despite changes in the frequency of the signal generated by optical encoder 18. As noted previously, the frequency of the signal generated by the optical encoder 18 changes when the angular velocity of the drive roller shaft 24 changes, which in turn is reflected in a change in the signal generated by optical encoder 18. It should be noted that it may be desirable to use a higher quality optical encoder, one that has higher resolution and eliminates the use of the programmable frequency multiplier 70. However, at the present time, optical encoders that provide an output signal on the order of megahertz would be very costly and in addition, would be too large to fit conveniently in the available space. Therefore, it appears that, for the present time at least, the use of a programmable frequency multiplier provides a practical and inexpensive method of achieving a high resolution equivalent optical encoder frequency, on the order of a megahertz, by using readily available, small size, low-resolution, inexpensive optical encoders.

In addition to the circuitry shown and discussed above, there are circuits that monitor operating conditions associated with the servo system and report such conditions to the host computer. In addition, the results of this diagnostic operation is made available to the microfilmer's service personnel and in a more limited form, the operator. The microcomputer 62 shuts down the film drive 38 by stopping the DC motor 36 whenever improper operation is detected in one or more of the major components.

By the addition of one encoder, information concerning film usage may be monitored by the computer. Film usage may be determined by feeding film drive encoder pulses into a counter. Use of an additional optical encoder on the film supply indicates when the film supply has completed a complete revolution. The computer is then given information as to the circumference of the film drive roller and the circumference of the film supply reel, which may be used to determine the number of film driven encoder pulses per revolution of the film supply reel. Thus, by knowing the film thickness and the diameter of the empty film reel core, the length of film remaining on the supply reel can be calculated. Alternatively, a look-up table could be generated experimentally, with an index to the look-up table representing the pulses from the film drive encoder per one revolution of the supply reel. Separate tables could be made for different thicknesses of film.

Lens Selection

The operator supplies information to the MCP (main control processor) or to the host computer, via the keyboard 61, concerning the image reduction ratio required for a given application. The MCP 60 is the host computer which performs task scheduling and the major computing functions of the microfilmer. After the operator enters the reduction ratio on keyboard 61, MCP 60 responds to the input and sends the appropriate signal (data) common via an RS-232C serial communication link to the film control microcomputer 62. The film control microcomputer 62 implements the selected reduction ratio by performing the following: (1) operating the lens drive motor 112 to select the appropriate lens focal length that corresponds to the requested reduction ratio and (2) controlling the motion of the film drive motor 21 to select a related document and film transport speed ratio that also corresponds to the image reduction ratio selected.

In one embodiment of the invention, the lens carriage takes the form of a turret 114 (FIG. 5) which carries lens holders 116 thru 126. Turret 114, as shown, provides holders for six lenses 138 thru 148 respectively, but any number may be used according to the number of reduction ratios desired and the space available. It is not necessary that all of the lens positions in turret 114 be occupied by a lens; this would be determined by the number of reduction ratios required by a particular microfilmer.

Figure 5:
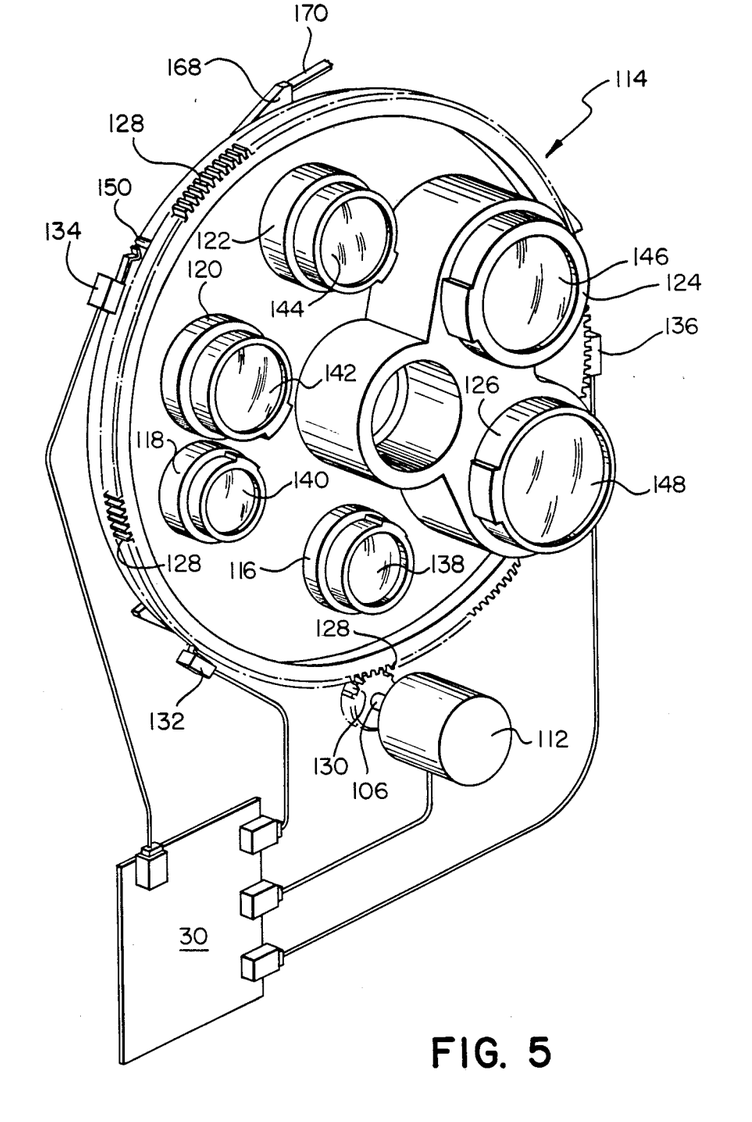
FIG. 5 is a schematic perspective diagram of the lens turret and drive components for positioning the lens.

Around the periphery of lens turret 114 are gear teeth 128 that mesh with a pinion gear 130 attached to the shaft 106 of DC lens drive motor 112. The electrical control signals for lens drive motor 112 originate from control electronics board 30 (described above) which carries the film control microcomputer 62. Adjacent peripheral gear teeth 128 of lens turret 114 are lens switches 132, 134 and 136 which are mounted so that each of the different lenses 138 thru 148 depending on its position, activates the corresponding combination of switches 132, 134 and 136 in a unique pattern. The film control microcomputer 62 monitors the signals from the lens switches 132, 136 and 136 so that it may determine which lens 138 thru 148 is in position. Three switches 132, 134 and 136 are used to distinguish up to eight (8) different logic states including seven different lens positions (six required in the illustrated embodiments 116 thru 126) and the eighth state is used to indicate that a lens is not in position. FIG. 5 illustrates lens switches 132, 134 and 136 as mechanical switches but optical or magnetic switches may be used. In order to select the lens that corresponds to the reduction ratio requested, via the keyboard 61, film control microcomputer 62 drives film drive motor 112 and gear 130 in a counter-clockwise direction at a fixed speed while constantly monitoring the signal originating from the switches 132, 134 and 136.

Figure 6:
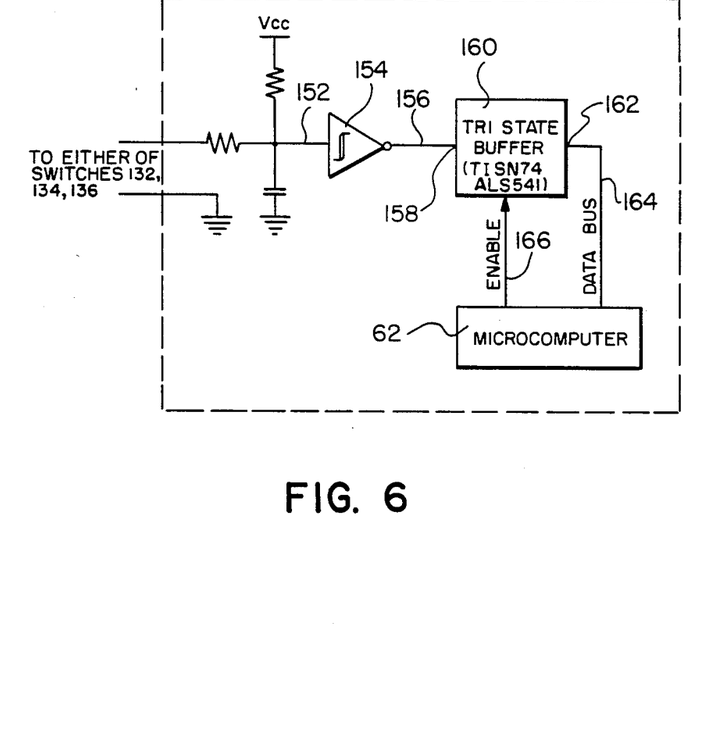
FIG. 6 is a circuit diagram illustrating in detail how the switches supply information relating to lens position to the microcomputer.

FIG. 6 illustrates schematically how each switch 132, 134 and 136 is connected to microcomputer 62. The presence of a pin 150 or raised portion on the periphery of lens turret 114 adjacent gear teeth 128 is used to close a given switch; in the absence of a pin, a switch remains in the open condition. A switch in the open position creates a logic one "1" signal at input 152 to the Schmitt trigger 154 (TI SN74LS14), which is inverted to a logic zero "0" at output 156 of the Schmitt trigger. When a switch comes into contact with pin 150, the switch is closed and a logic zero "0" is present on input 152 to Schmitt trigger 154. Once again, inversion by Schmitt trigger 154 results in a logic one "1" at its output 156.

The output 156 of Schmitt trigger 154 is directed to a tri-state buffer 160 (TI SN541) (TI SN74ALS541). The input signal 158 to tri-state buffer 160 is not transferred to its output 162, which is connected to data bus 164 of microcomputer 62. The input 158 prevents the tri-state buffer's input from being transferred to its output until microcomputer 62 enables buffer 160, via line 166. As long as tri-state buffer 160 remains disabled, its output 162 state does not reflect its input 158. This state is known as the high impedance state. However, when tri-state buffer 160 is enabled by the microcomputer 62, whatever logic state exists on its input 158 is transferred to its output 162 which as mentioned earlier is connected to data bus 164 so that the data may be read into the microcomputer 62.

The following truth table illustrates the logic signals that can be generated by a three switch system 132, 134 and 136, and which support a seven position lens system with one no lens position:

| Lens Pos. | Switch #1 | Switch #2 | Switch #3 | |
|---|---|---|---|---|
| No Lens | 0 | 0 | 0 | Switch on |
| Lens #1 | 0 | 0 | 1 | → logic "1" |
| Lens #2 | 0 | 1 | 0 | Switch off |
| Lens #3 | 0 | 1 | 1 | → logic "0" |
| Lens #4 | 1 | 0 | 0 | |
| Lens #5 | 1 | 0 | 1 | |
| Lens #6 | 1 | 1 | 0 | |
| Lens #7 | 1 | 1 | 1 | |

During operation, microcomputer 62, after determining the desired lens position, enables the Drive Electronics 108 which contains a current sensing circuit (not shown) and a servo amplifier (not shown) for controlling Lens Drive Motor 112 which is in mechanical engagement with lens turret 114. Lens Drive Motor 112 is driven in a counterclockwise direction and at a fixed speed while microcomputer 62 constantly monitors the state of lens switches 132, 134 and 136. Microcomputer 62 stops the lens drive motor 112 when the logic signal generated by switches 132, 134 and 136 corresponds to the desired optical reduction ratio previously determined by an operator. That logic signal indicates that the correct lens is in operative position on turret 114. In order to afford more accurate lens positioning, a ratchet 168 and pawl 170 combination are used. After microcomputer 62 determines that the correct lens position has been achieved, lens drive motor 112 is reversed causing turret 114 to rotate in the opposite (clockwise) direction, until pawl 170 engages the tooth of ratchet 168, preventing further movement of lens turret 114. When pawl 170 engages the tooth of ratchet 168, the current drawn by lens drive motor 112 increases significantly. This increased current is sensed by circuitry in drive electronics 108 on electronics board 58 and is used to remove power from lens drive motor 112.

Advantages and Industrial Applicability

Use of the present invention offers advantages in machine flexibility by giving a microfilm operator the ability to easily change the lens focal length and hence the reduction ratio in a microfilmer when different jobs or documents may require different reduction ratios to obtain the desired size of the image on the film. The user/operator does not have to handle the lens to obtain the desired image reduction ratio. By eliminating the need to handle the lens, the risk of dropping, soiling or damaging a lens has been eliminated. Additionally, the microcomputer automatically establishes the correct film transport speed in accordance with the requested reduction ratio.

The invention is useful in automatic microfilm cameras capable of filming documents at a number of different reduction ratios. A document transport enhances the filming speed by advancing documents of different sizes through an exposure station and depositing them in a bin or hopper after being photographed. According to the invention, the microfilmer's computer based on information received from the operator via a keyboard, selects the appropriate lens from an array of lenses to provide the desired reduction ratio.

What is claimed is:

1. In an automatic microfilm camera having a plurality of lenses having different focal lengths in accordance with designated image reduction ratios, said camera comprising:
   (a) carriage means for carrying a plurality of lenses having different focal lengths;
   (b) means for positioning any one of said plurality of lenses on said carriage into an operative position;
   (c) electronic means for controlling said positioning means; and
   (d) input means for supplying information to said electronic means concerning the selection of a desired one of said plurality of lenses which corresponds to the image reduction ratio required; and
   (e) feedback means to said electronic means to provide information as to the position of said carriage means.

2. The invention set forth in claim 1 wherein said carriage means is in the form of a lens turret.

3. The invention set forth in claim 1 wherein said electronic means is in the form of a microcontroller.

4. The invention set forth in claim 1 wherein said input means is in the form of a keyboard.

5. An automatic microfilm camera having a document transport system, a film drive and a plurality of lenses having different image reduction ratios, said camera comprising:
   means for driving said document transport system;
   means for monitoring the speed of said document transport system and generating a first signal proportional thereto;
   means for driving said film drive;
   carriage means for carrying said lenses;
   means for positioning any one of said plurality of lenses on said carriage into an operative position;
   input means for selecting a desired image reduction ratio; and
   control means responsive to said input means for controlling the speed of said film drive in response to said first signal for electronically synchronizing the speed of said film drive to the speed of said document transport system in accordance with said inputted image reduction ratio, and for controlling said position means in accordance with said input means, thereby for positioning the corresponding one of said plurality of lenses in said operative position.

* * * * *